United States Patent
Hansen et al.

(10) Patent No.: US 10,944,248 B2
(45) Date of Patent: Mar. 9, 2021

(54) SMART HOIST

(71) Applicant: Avista Corporation, Spokane, WA (US)

(72) Inventors: Brady Hansen, Spokane, WA (US); Carlos Limon, Spokane, WA (US); Chris Lum, Spokane, WA (US); George Muriithi, Spokane, WA (US)

(73) Assignee: Avista Corporation, Spokane, WA (US)

( * ) Notice: Subject to any disclaimer, the term of this patent is extended or adjusted under 35 U.S.C. 154(b) by 376 days.

(21) Appl. No.: 15/924,150

(22) Filed: Mar. 16, 2018

(65) Prior Publication Data
US 2019/0288496 A1    Sep. 19, 2019

(51) Int. Cl.
*H02G 7/02* (2006.01)
*H02G 1/04* (2006.01)
*G01L 5/04* (2006.01)

(52) U.S. Cl.
CPC .............. *H02G 7/02* (2013.01); *G01L 5/042* (2013.01); *H02G 1/04* (2013.01)

(58) Field of Classification Search
CPC . H02G 7/02; H02G 1/04; H02G 11/02; H04B 1/38
See application file for complete search history.

(56) References Cited

U.S. PATENT DOCUMENTS

| | | | |
|---|---|---|---|
| 2009/0267037 A1* | 10/2009 | Johnson | H02G 1/02 254/134.3 PA |
| 2010/0138186 A1 | 6/2010 | O et al. | |
| 2012/0197589 A1 | 8/2012 | Kansala et al. | |
| 2014/0041926 A1* | 2/2014 | McGuire | H02G 7/02 174/40 TD |
| 2017/0227596 A1 | 8/2017 | Sozer et al. | |
| 2017/0259941 A1 | 9/2017 | Briggs, IV et al. | |
| 2018/0062360 A1* | 3/2018 | Nordlin | H02G 1/005 |
| 2019/0039855 A1* | 2/2019 | Nutt | B65H 59/40 |
| 2019/0288496 A1* | 9/2019 | Hansen | H02G 7/02 |
| 2020/0295555 A1* | 9/2020 | Jackson | H04B 1/38 |

FOREIGN PATENT DOCUMENTS

CN    103292940    9/2013

OTHER PUBLICATIONS

PCT Search Report and Written Opinion dated Jul. 22, 2019 for PCT Application No. PCT/US19/22266, 10 pages.

* cited by examiner

*Primary Examiner* — Lee D Wilson
(74) *Attorney, Agent, or Firm* — Lee & Hayes, P.C.

(57) ABSTRACT

Current hoist systems often use a manual crank system with a lever arm that ratchets a rotational drum to tension a conductor. This disclosure describes systems and techniques for creating and operating a hoist system when connected and applying tension to an energized or de-energized conductor. Additionally, the systems and techniques may be applied to lifting or tensioning electrical equipment or cables that may support the conductor infrastructure. A hoist system may use a locally driven motor to apply a desired tension to a conductor or cable and may be controlled by an operator located at or away from the hoist system itself.

8 Claims, 11 Drawing Sheets

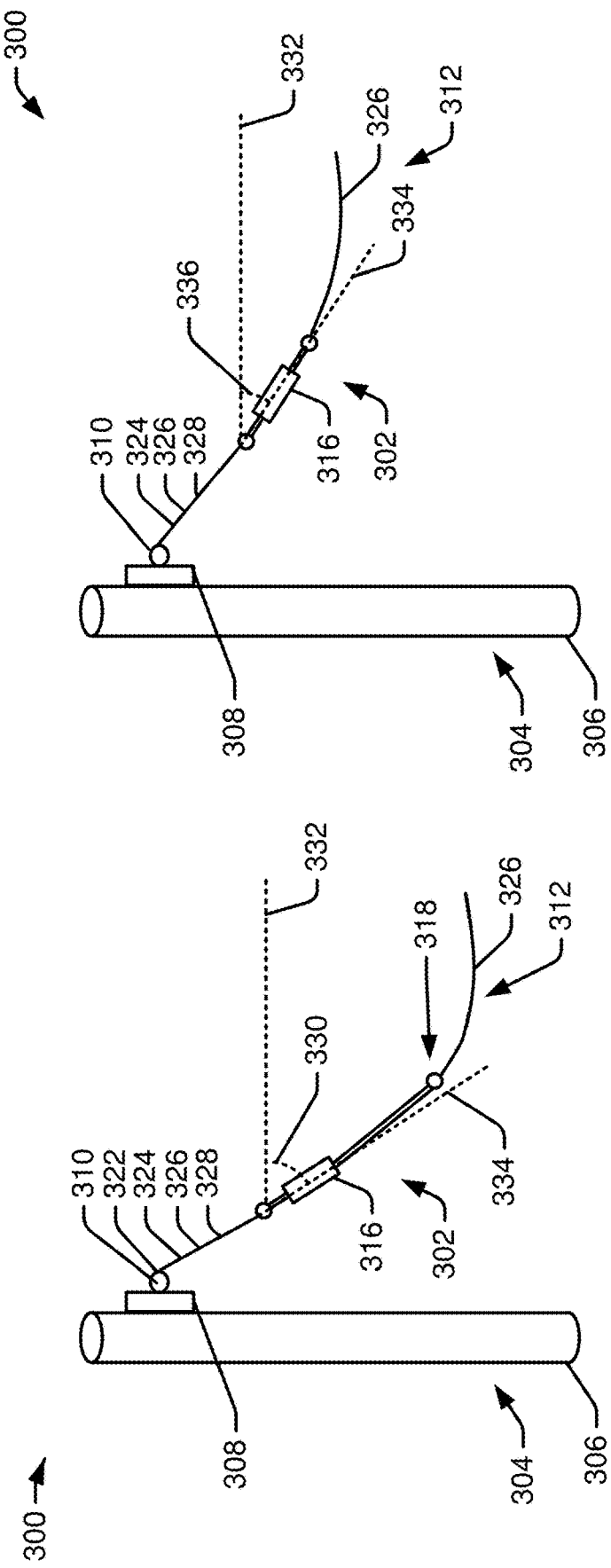

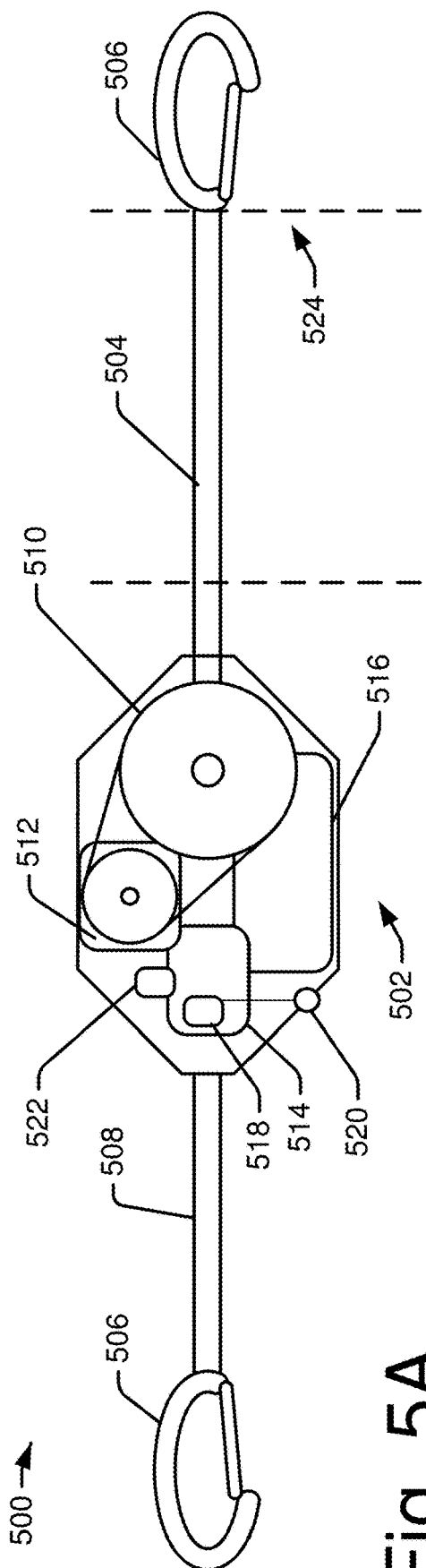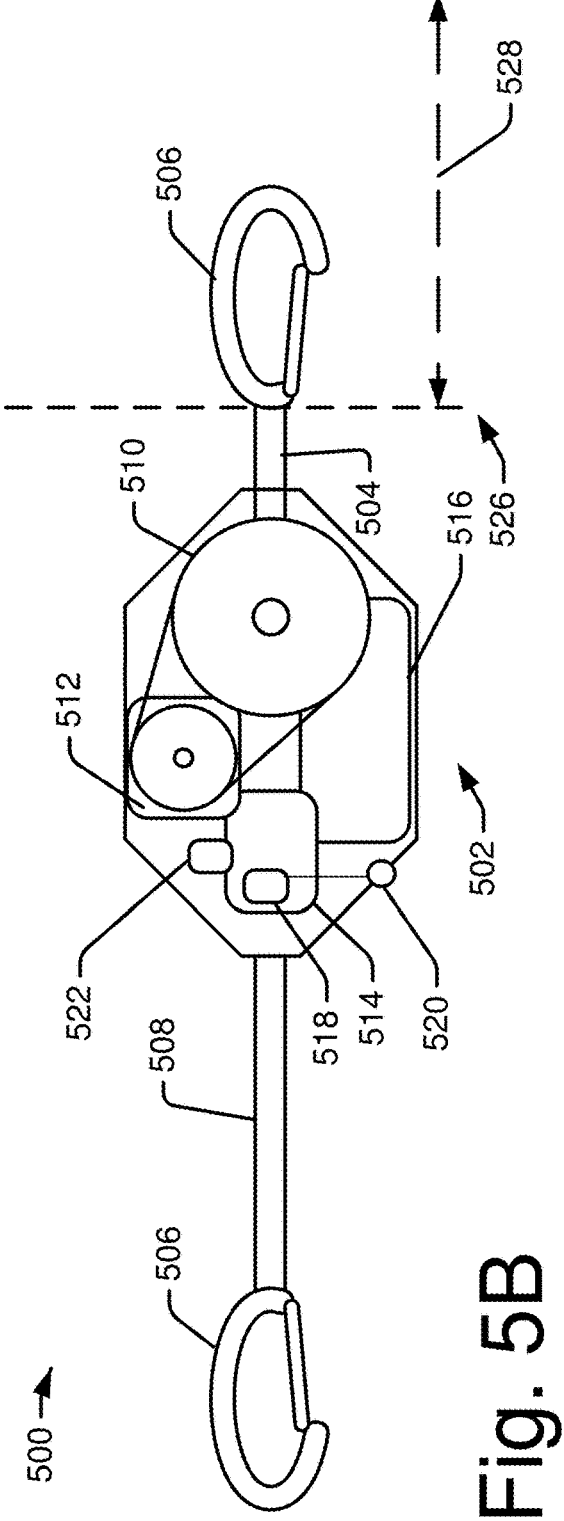
Fig. 5A
Fig. 5B

SMART HOIST

BACKGROUND

Current hoist systems, that meet industry standards, often use a manual crank system with a lever arm that ratchets a rotational drum to tension a conductor. Additionally, a hot stick is often used on the lever arm to create sufficient distance between an operator and the hoist system when the hoist is connected to the conductor.

SUMMARY

This disclosure discusses a hoist system that may be configured to receive data from sensor, determine a conductor status and whether that status is within a target threshold range, and adjust a load on the conductor to bring it to within the threshold range. Various embodiments contemplate calculating and/or applying a force increment to apply to the conductor, where the force increment may be set to be below a maximum increment where a sum of the maximum increment and an existing force on the conductor is within a threshold range of conductor tension.

Additionally or alternatively, various embodiments contemplate calculating and/or applying a force increment to bring the conductor to within the threshold range at a set force application rate. Additionally or alternatively, various embodiments contemplate receiving data from hoist sensors, external sensors, among others. For example, the received data may comprise conductor tension data, strap tension data, motor torque data, motor amperage data, motor flux data, ambient temperature data, hoist angle data, hoist acceleration data, conductor temperature data, conductor material data, conductor size data, distance to adjacent pole data, cardinal direction data, or combinations thereof. Additionally or alternatively, the period may comprise a vibratory period or vibratory frequency of the conductor indicating a tension of the conductor. Additionally or alternatively, various embodiments contemplate that the threshold may be based at least in part on characteristics of the conductor, weather, time of year, span, distance from the pole, type of connection to pole, or combinations thereof.

Additionally or alternatively, various embodiments contemplate that a hoist system may comprise a body comprising an electrically insulated outer surface, a control system that may be housed substantially within the body, a tensioning system that may be housed substantially within the body and may be controllably coupled to the control system. Additionally or alternatively, the hoist system may also comprise a connection member that may be adjustably coupled to the tensioning system and selectively couplable to a conductor where the tensioning system may be selectable to apply a force to the connection member to draw at least a portion of the connection member into the body. Additionally or alternatively, various embodiments contemplate that the connection member may be selectively couplable to a conductor via a wire clamp, a friction clamp, an insulation stick, or combinations thereof. For example, the connection member may comprise an insulated strap, a nylon strap, an Ultra High Molecular Weight Polyethylene (UHMWPE) strap, or combinations thereof. Additionally or alternatively, various embodiments contemplate that the tensioning system may comprise a drum, wherein the at least a portion of the connection member is windable around at least a portion of the drum. Additionally or alternatively, the tensioning system may comprise one or more of a direct drive, a pulley, a belt, or a gear.

BRIEF DESCRIPTION OF THE DRAWINGS

The Detailed Description is set forth with reference to the accompanying figures. In the figures, the left-most digit(s) of a reference number identifies the figure in which the reference number first appears. The same reference numbers in different figures indicate similar or identical items.

FIGS. 3A-B show an illustrative embodiment of hoist system.

FIGS. 5A-B show an illustrative embodiment of hoist system.

DETAILED DESCRIPTION

Overview

Figure 1:
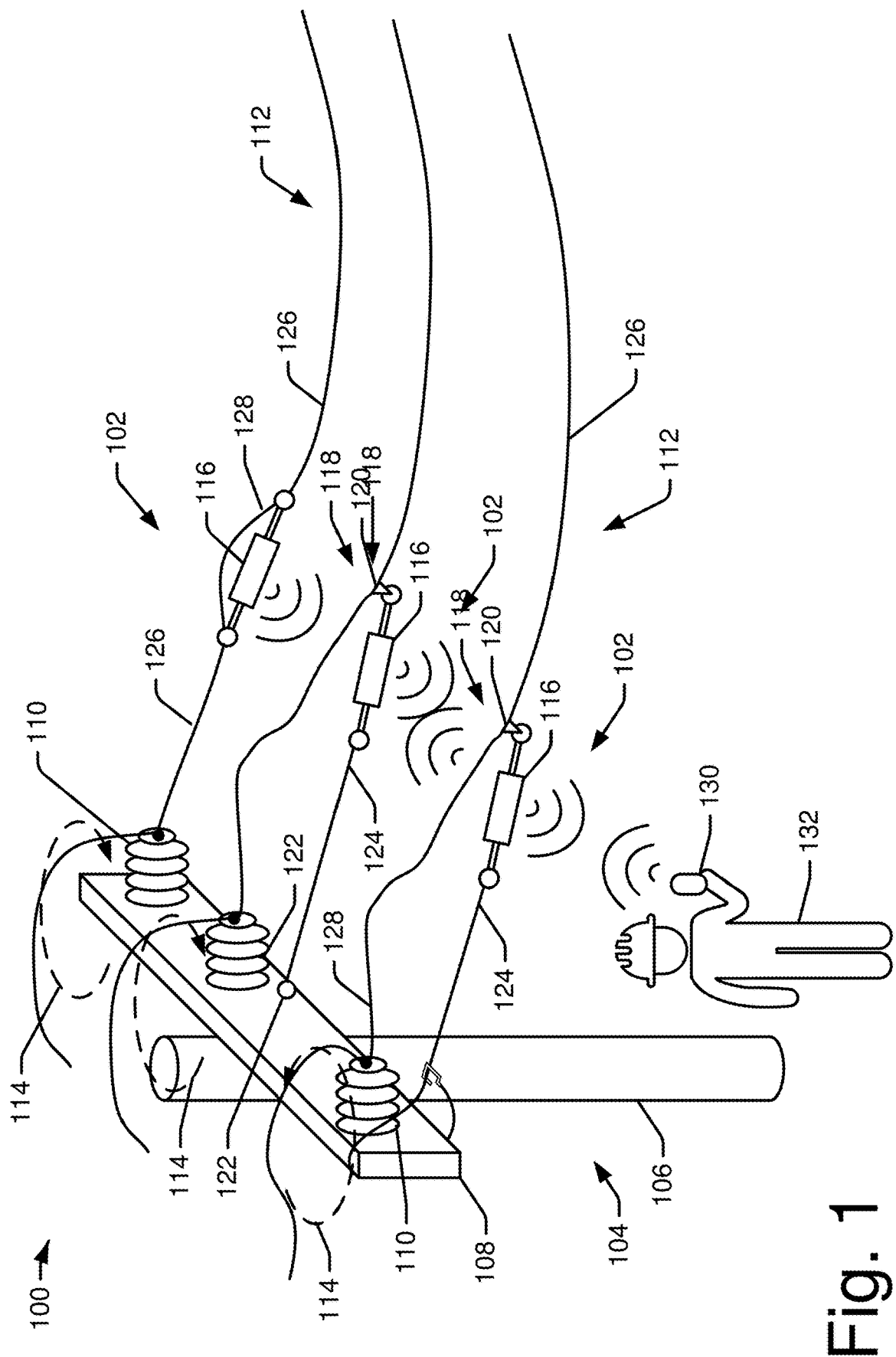
FIG. 1 shows an illustrative embodiment of an operating environment of a hoist system.

Current hoist systems, that meet industry standards, often use a manual crank system that allows a rotational drum to tension a conductor. Additionally, a hot stick, and in certain cases a second hot stick placed in series with the first, is used to create sufficient distance between an operator and the hoist system when it is connected to the conductor. The operator may need to manually operate the crank to apply a load to a conductor. Often these loads can reach between 2000 lbs-4000 lbs of horizontal tension. Additionally or alternatively, various embodiments contemplate load may reach up to 50,000 lbs of horizontal tension in various settings and may reach up to 110,000 lbs of horizontal tension in other settings.

For example, the existing hoist systems, also known as a "hot hoist," is used to re-conductor both dead and live lines. This has a degree of risk attributed to it due to the weight and operation, which can cause repetitive motion injuries to employees and/or contractors. In addition, in order to operate the current hot hoists operators must place themselves in unsafe conditions and potentially cause them to be near or work within minimum approach distances to live conductors and equipment. The current hot hoists also can present problems where the cross arms torque and there is a fairly high instance of mechanical strain that can lead to failure.

Accordingly, there is a need to improve safety and improve the efficiency and effectiveness of hoist systems.

This disclosure describes systems and techniques for creating and operating a hoist system when connected and applying tension to a hot, live, energized, or de-energized electrical conductor. Additionally, the systems and techniques may be applied to lifting or tensioning electrical equipment or cables that may support the electrical conductor infrastructure. Various embodiments contemplate a hoist system that may use a locally driven motor to apply a desired tension to a conductor or cable. Various embodiments contemplate that the hoist system may be controlled by an operator located at or away from the hoist system itself.

Additionally, to operate the current hoist systems an operator, for example, a lineman, uses a lever arm in a ratcheting motion to reel in a strap attached to a conductor. The addition of a motor driven by a controller will reduce repetitive motion injuries to operators.

Additionally or alternatively, various embodiments contemplate that a hoist system may collect data of the operational environment. For example, the hoist system may collect and record data including, but not limited to, conductor tension, guy wire tensions, sag, moment, conductor temperature, ambient temperature, span length, conductor type, number of phase conductors, configuration, coordinates of or relative position of the pole to surroundings, age of the pole, pole identifies, among others, or combinations thereof.

Additionally or alternatively, various embodiments contemplate a hoist system comprising a wireless, battery operated hoist that would automate, or increase automation over current technology, the process of installing, tensioning, or re-sagging conductors. For example, using an internal dynamometer, the hoist system may use tension measurement along with conductor length to allow for the determination of cable sag and tensioning. Additionally or alternatively, various embodiments contemplate that the hoist system may also use one or more of ambient conductor temperature, guywire tensions and angles, among others, to determine cable sag and tensioning. Additionally or alternatively, the hoist system may also allow for either wireless or autonomous control during operation and provide additional data that will be valuable for analytics and documentation.

Additionally or alternatively, various embodiments contemplate measuring a tension of the conductor based on electrical characteristics of a motor in the hoist system. With this capability, the hoist system may eliminate over tension scenarios and be capable of pulling the conductor to its designed sag quantity. Additionally or alternatively, various embodiments contemplate multiple hoist systems being used to pull conductors simultaneously without creating torque on cross arms by balancing the pulling tensions. Additionally or alternatively, various embodiments contemplate an improvement to the current hoisting mechanism that may eliminate unwanted conductor movement, Additionally or alternatively, various embodiments may allow transferring a conductor to another attachment point with two (or more) hoists. For example, this could be done with synchronization between the two (or more hoists) and may help avoid choppy conductor transfer.

Additionally or alternatively, by utilizing materials in the body different from and in a new configuration than current hoist systems, a substantial improvement in safety could be made by reducing the hoists electrically conductive elements.

For example, current hot hoist operators must place themselves within minimum approach distances to live lines. Various embodiments contemplate that in order to increase the distance between operators and dangerous operating conditions, a motor on the hoist system may be controlled wirelessly through the use of an interface controlling a motor driver on the hoist system. This feature may improve safety, for example, because it gives the operator a better viewpoint of the hoisting operation and makes the operator less likely to be struck should a rigging component fail.

Additionally, current hot hoists are generally operated one at a time. Tensioning one phase at a time introduces unbalanced forces on both the cross arm and pole. As a result of the unbalanced forces, the cross arm can either become warped or damaged, and in the worst case, fail. The unbalanced forces on the pole can cause it to act like a corkscrew and be pulled out of the ground. Various embodiments contemplate that multiple hoist system may be operated concurrently, zeroing the otherwise unbalanced forces, which may reduce the stress on the cross arm and pole. Various embodiments contemplate that the hoist system will comprise a tension sensor to measure the tension of each phase or conductor. Additionally or alternatively, various embodiments contemplate that the hoist system may use position, speed, and acceleration controlled wirelessly while in operation. Additionally or alternatively, the tension measurement may ensure that the hoist systems are able to drive any unbalanced forces to zero.

Additionally or alternatively, various embodiments contemplate populating and using conductor libraries that may hold operation environmental data, for example, weight, tension, span length, conductor type, conductor weight per length, among others, that may be used to automate the tensioning and installing of a conductor. Additionally or alternatively, use of telemetry and tension information may allow a company to maintain asset records.

Illustrative Operational Environments

FIG. 1 shows an illustrative operational environment 100 usable to implement hoist system 102. The operational environment 100 may include a power pole system 104 comprising a pole 106 and a cross arm 108. Additionally or alternatively, the power pole system 104 may comprise insulators 110. For example, insulators 110 may be located on the cross arm 108 or on the pole 106. Insulators 110 may be coupled to conductors 112 where conductors 112 may transmit or distribute electrical energy. Conductors may be supported by the power pole system 104 across various distances. For example, various embodiments contemplate that a conductor 112 may be supported by an insulator 110 on cross arm 108. When supported by the cross arm 108, a conductor 112 will have a tension along at least a portion of its length. In various configurations, the tension may translate into a force applied to the cross arm 108. As one of ordinary skill in the art would understand, the tension may create a moment 114 applied to the power pole system 104. For example, depending on the magnitude of the tension of the conductor 112, and a distance of the supporting insulator 110 from the pole 106 on the cross arm 108, a moment 114 may be generated. In various situations, it is desirable to keep a sum of the moments 114 as well as other acting forces and moments within a desired threshold range. In various configurations contemplate that a conductor 112 may have equal tension on either side of the cross arm 108 and may effectively cancel out a moment or torque 114 applied to power pole system 104. However, in other configurations, for example, a dead end, a change in direction of the line, a change in elevation, among others, as well as during installation, the conductor 112 might not have an equalizing tension applied to the other side of the cross arm 108. Various embodiments contemplate that it may be desirable to keep the sum of the moments and forces within the desired threshold range for safety of the public, utility workers, as well as limiting damage to equipment including, but not limited to, the power pole system 104 and conductors 112. For example, if one of the three conductors 112 is tensioned too high relative to the other two conductors 112, it may cause a large moment and torque applied to connection between the pole 106 and cross arm 108. This may cause the cross arm 108 to break or detach from pole 106.

FIG. 1 also shows an illustrative embodiment of a hoist system 102. Various embodiments contemplate that hoist system 102 may comprise a body 116 and may be attached to a conductor 112 through connection 118. For example, various embodiments contemplate connecting the hoist system 102 to a conductor 112 through a conductor grip 120. Additionally or alternatively, various embodiments contemplate connecting the hoist system 102 to a conductor 112 through other connection devices and techniques including, but not limited to, rope, friction grips, spring grips, splice sleeves, among others. Additionally or alternatively, various embodiments contemplate that hoist system 102 may be connected to the pole system 104 through various attachment techniques. For example, hoist system 102 may be connected to cross arm 108 through attachment point 122. Attachment point 122 may be located on pole 106 or cross arm 108 or other locations. Attachment point 122 may comprise an anchor or a location for a sling. Additionally or alternatively, hoist system 102 may be coupled to attachment point 122 via link 124. Various embodiments contemplate that link 124 may comprise various components or segments. Additionally or alternatively, various embodiments contemplate that link 124 may provide an electrically insulated connection between pole system 104 and conductor 112. Additionally or alternatively, various embodiments contemplate that link 124 may provide a mechanical connection between pole system 104 and conductor 112 suitable to applying a force to conductors 112 sufficient to reach a tensioning force within a desired threshold, a sag profile of conductor 112 within a desired sag threshold, or combinations thereof among other criteria. For example, link 124 may comprise a tether, an insulation stick, insulating bridge, dead end clamp, wire puller hook (e.g., spoon), dynamometer, insulated strap, nylon strap, poly proline, high elastic polyester, Ultra High Molecular Weight Polyethylene (UHMWPE) (e.g., Dyneema™), dielectric rope material, combinations thereof, among other elements. Additionally or alternatively, various embodiments contemplate that where a strap is discussed, the discussion may also include a rope, chain, link, or combinations thereof, among other connection techniques. For example, when hoist system 102 is attached at connection 118 and at attachment point 122, and tension is applied through hoist system 102 to conductor 112, the tension may cause a portion 126 of conductor 112 to be in tension while, a portion 128 of conductor 112 to be under less tension when compared to portion 126 or even slack. Additionally or alternatively, hoist system 102 may be coupled to conductor 112 at a point away from pole system 104 or connected to pole system 104 through a portion 126 of conductor 112. In this configuration, various embodiments contemplate that when tension is applied to conductor 112 through hoist system 102, tension is applied in portions 126 of conductor 126 while portion 128 of conductor 112 may be under less tension when compared to portion 126 or even slack.

Additionally or alternatively, insulator 110 on cross arm 108, pole 106, and other supporting cross arms may be temporarily replaced with sheaves, travelers, or combinations thereof, among others, to support the conductor 112. Additionally or alternatively, travelers may be used in place of pin insulator or vice top insulators.

FIG. 1 shows an illustrative embodiment of hoist system 102 having a control system that may be interacted with wirelessly. For example, hoist system 102 may interact wirelessly with device 130. Device 130 may be operated locally by user 132 or from a remote location. As will be discussed later, various embodiments contemplate that device 130 may communicate with hoist systems 102 directly. Additionally or alternatively, various embodiments contemplate that various units of hoist system 102 may communicate with other units of hoist system 102 or device 130, for example, in a master/slave hierarchy or a distributed peer-to-peer network, or combinations thereof to control the various units of the hoist system 102.

Additionally or alternatively, that while the above discussion uses an above ground conductor supported by a pole system, various embodiments contemplate that the hoist system 102 may be used to pull or tension conductors below ground as well. For example, one or more conductors may be pulled or tensioned through a conduit. Here, a hoist system maybe anchored at one end of a conduit opening and attached to a conductor at another location within or outside of the conduit. Here, the hoist system may be operated to pull or tension the conductor in the conduit. Additionally or alternatively, several benefit may be realized using one or more of these embodiments. For example, the hoist system may be located down in an access pit or hole and operated to apply the force to the conductor. By being down in the access pit or hole, the hoist system may be oriented with a preferable angle with respect to the conductor and conduit. For example, by pulling substantially parallel to an internal surface of the conduit, for example, the conduit exit, the hoist system and conductor may require a lower power to pull or tension the conductor when compared to a vehicle mounted winch or larger device located outside of the access pit or hole. In this configuration, the vehicle mounted winch would require an additional bend in the conductor, and create a less efficient pulling angle causing additional drag to the conductor thereby increasing the force required to pull the conductor.

Figure 2:
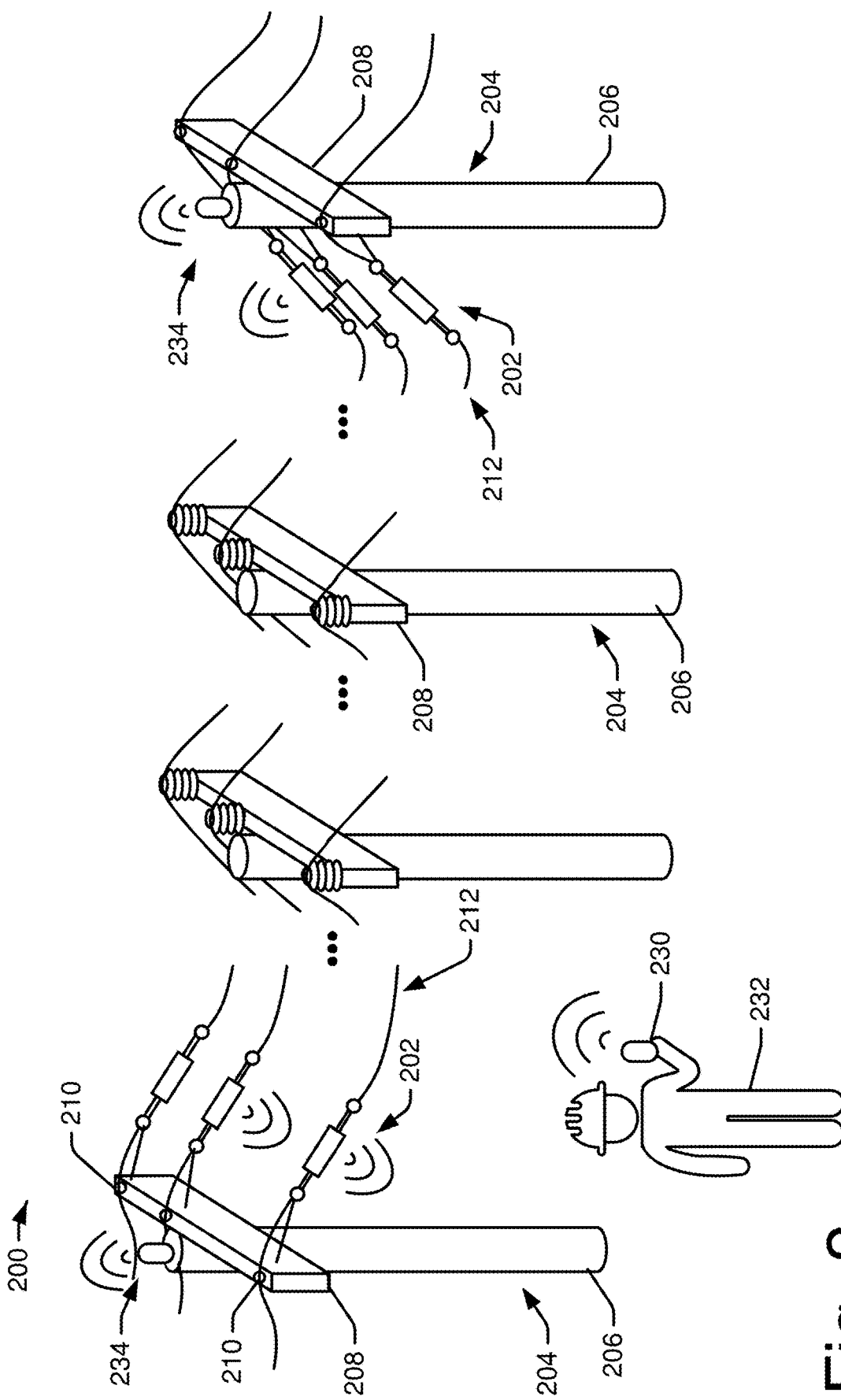
FIG. 2 shows another illustrative embodiment of an operating environment of a hoist system.

FIG. 2 shows an illustrative operational environment 200 usable to implement hoist system 202. The operational environment 200 may include a power pole system 204 comprising a pole 206 and a cross arm 208. Additionally or alternatively, the power pole system 104 may comprise temporary connection points 210 including, for example, sheaves, travelers, or combinations thereof, among others. For example, connection points 210 may be located on the cross arm 208 or on the pole 206. Connection points 210 may be coupled to conductors 212 where conductors 212 may transmit or distribute electrical energy.

FIG. 2 shows an illustrative embodiment where multiple hoist system 202 units may be connected to each conductor 212. Additionally or alternatively, various embodiments contemplate a single hoist system 202 unit or three or more hoist system 202 units connected to an individual conductor 212. FIG. 2 also shows conductor 212 spanning multiple pole systems 204. For example, various embodiments contemplate conductor 212 spanning between a connection point (not shown) and one pole system 204. Additionally or alternatively, various embodiments contemplate conductor 212 spanning multiple pole systems 204, for example, 2, 5, 10, 50, 100, 200, or more pole systems 204. Additionally or alternatively, various embodiments contemplate conductor 212 spanning multiple pole systems 204 over a distance, for example, a few feet, 100 yards, quarter of a mile, a mile, 2 miles, 4 miles, 6 miles, 8 miles, or more.

Additionally or alternatively, various embodiments contemplate hoist system 202 units communicating with other hoist system 202 units, control device 230, transmission device 234, or combinations thereof among other communication devices. For example, various embodiments contemplate hoist system 202 units communicate wirelessly with each other and/or control device 230. Additionally or alternatively, various embodiments contemplate hoist system 202 units and/or control device 230 using transmission device 234 to communicate at least a portion of communication between different devices.

FIGS. 3A and B show an illustrative embodiment system 300 with hoist system 302. The system 300 may include a power pole system 304 comprising a pole 306 and a cross arm 308. Additionally or alternatively, the power pole system 304 may comprise connection device 310. For example, connection devices 310 may be located on the cross arm 308 or on the pole 306. Connection devices 310 may be coupled to conductors 312 where conductors 312 may transmit or distribute electrical energy. Conductors 312 may be supported by the power pole system 304 across various distances. For example, various embodiments contemplate that a conductor 312 may be supported by a connection device 310 on cross arm 308.

FIGS. 3A and B also show an illustrative embodiment of a hoist system 302. Various embodiments contemplate that hoist system 302 may comprise a body 316 and may be attached to a conductor 312 through connection 318. Additionally or alternatively, various embodiments contemplate that hoist system 302 may be connected to the pole system 304 through various attachment techniques. For example, hoist system 302 may be connected to cross arm 308 through various configurations, for example, at least those discussed with respect to FIGS. 1 and 2. Additionally or alternatively, various embodiments hoist system 302 may be connected to cross arm 308 through attachment point 322. Attachment point 322 may be located on pole 306 or cross arm 308 or other locations. Attachment point 322 may comprise an anchor or a location for a sling. Additionally or alternatively, hoist system 302 may be coupled to attachment point 322 via link 324. Various embodiments contemplate that link 324 may comprise various components or segments. Additionally or alternatively, when hoist system 302 is attached at connection 318 and at attachment point 322, and tension is applied through hoist system 302 to conductor 312, the tension may cause a portion 326 of conductor 312 to be in tension while, a portion 328 of conductor 312 to be under less tension when compared to portion 326 or even slack. Additionally or alternatively, hoist system 302 may be coupled to conductor 312 at a point away from pole system 304 or connected to pole system 304 through a portion 326 of conductor 312. In this configuration, various embodiments contemplate that when tension is applied to conductor 312 through hoist system 302, tension is applied in portions 326 of conductor 326 while portion 328 of conductor 312 may be under less tension when compared to portion 326 or even slack.

FIG. 3A shows an illustrative embodiment of hoist system 302 in a first configuration. For example, a portion of hoist system 302 is extended relative to the body 316. This illustrative embodiment shows a first angle 330 between two projections 332 and 334. For example, projection 332 may be defined as an arbitrary projection, for example, a horizon, a perpendicular to a surface, a direction based on magnetic fields, gravitational fields, visually defined projection, combinations thereof, among others. Various embodiments contemplate projection 332 defined in a Newtonian reference frame. Additionally or alternatively, projection 334 may be defined as an arbitrary projection referenced from the hoist system 302, for example from the body 316. Fig. A shows projection 334 as defined with respect to an axial projection of body 316. However, one of ordinary skill would understand any definition of a projection may be used. As tension is applied to conductor 312, angle 330 may change.

FIG. 3B shows, for example, hoist system 302 in a second configuration. For example, a portion of hoist system 302 is retracted into body 316 relative to the portion of hoist system 302 if configuration one as shown in FIG. 3A. This retraction into body 316 may increase the tension in conductor 312 and may cause a different angle between projections 332 and 334, for example, angle 336. Various embodiments contemplate that hoist system 302 may apply tension to conductor 312 until angle 336 is determined to be within a threshold range. For example, various embodiments contemplate a threshold range may be based at least in part on characteristics of conductor 312, ambient temperature, weather conditions (including for example, wind loading, ice loading, snow loading, ambient temperature extremes, or combinations thereof among others), time of year, elevation of adjacent pole systems 304, span between pole systems 304, geographical location, climate, regulations, best practices, sag requirements, as well as distance of hoist system 302 from connection to pole system 304, or combinations thereof, among other factors.

Additionally or alternatively, angles 330 and 336 may be determined based at least in part on data collected from sensors in hoist system 302, for example, accelerometers. Additionally or alternatively, the angle may be determined based at least in part on data collected from external sensors, for example, an optical measurement of the angle between projections 332 and 334.

Illustrative Embodiment of Hoist System

FIG. 4 shows an illustrative embodiment of hoist system 400. For example, various embodiments contemplate hoist system 400 having a body section 402 coupled to at least one extendable member 404. Additionally or alternatively, extendable member 404 may be coupled to an attachment interface 406, for example, a hook, loop, carabiner, or combinations thereof, among others. Additionally or alternatively, various embodiments contemplate an attachment interface integrating sensors. For example, an attachment interface may comprise a friction grip with a temperature sensor where the temperature sensor may monitor the temperature of the conductor, the ambient temperature, or combinations thereof. Various embodiments contemplate extendable member 404 being selectably extended from or retracted into body section 402.

Additionally or alternatively, various embodiments contemplate a member 408 extending from body section 402. Various embodiments contemplate member 408 extending from body section 402 on a side substantially distal from the side extendable member 404 is coupled to. Additionally or alternatively, various embodiments contemplate that member 408 may be substantially rigid with respect to body section 402. Additionally or alternatively, various embodiments contemplate member 408 being extendable and retractable with respect to body section 402. For example, various embodiments contemplate member 408 being configured and operable substantially similar to extendable member 404. Additionally or alternatively, various embodiments contemplate member 408 being coupled to an attachment interface 406. Various embodiments contemplate that attachment interface 406 may be configured to be suitable to attached to various industry tools, for example, cable or wire grips, anchors, insulation sticks, dynamometers, clamp attachments, spoons, insulating bridges, among others, or combinations thereof. Additionally or alternatively, various embodiments contemplate attachment interface 406, member 408, body 402, member 404 are configured to apply a force sufficient to tension the desired cable and/or otherwise operate in the operational environment.

Figure 4C:
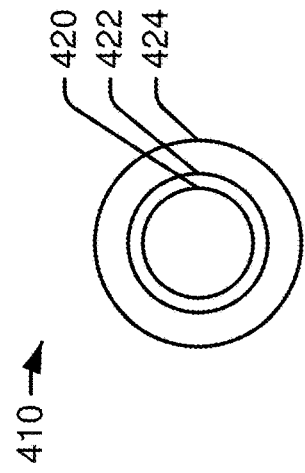
FIGS. 4A-C show an illustrative embodiment of hoist system.

Additionally or alternatively, various embodiments contemplate body 402 comprising a structure sufficient to support the operation of the extendable member 404 extending and retracting while applying a force to an object, for example, a cable as shown in FIGS. 1 and 2. Various embodiments contemplate a structure comprising a frame, system of frames, monocoque, semi-monocoque, lattice, or combinations thereof, among other configurations. For example, FIG. 4A shows a monocoque lattice hybrid design utilizing a triangular lattice structure 410. Additionally or alternatively, various embodiments contemplate that the triangular lattice structure may be configured to have a substantially cylindrical central portion 412 with substantially conical portions 414 on either end. Additionally or alternatively, various embodiments contemplate that member 408 may connect to or through a first conical portion 414 while extendable member 404 may connect through a second conical portion 414.

Figure 4B:
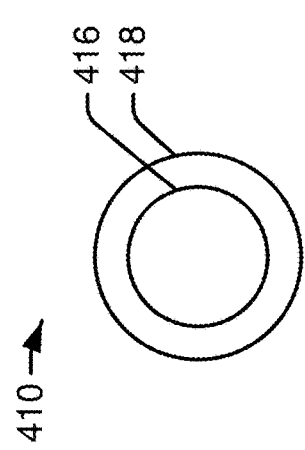
Figure 4A:
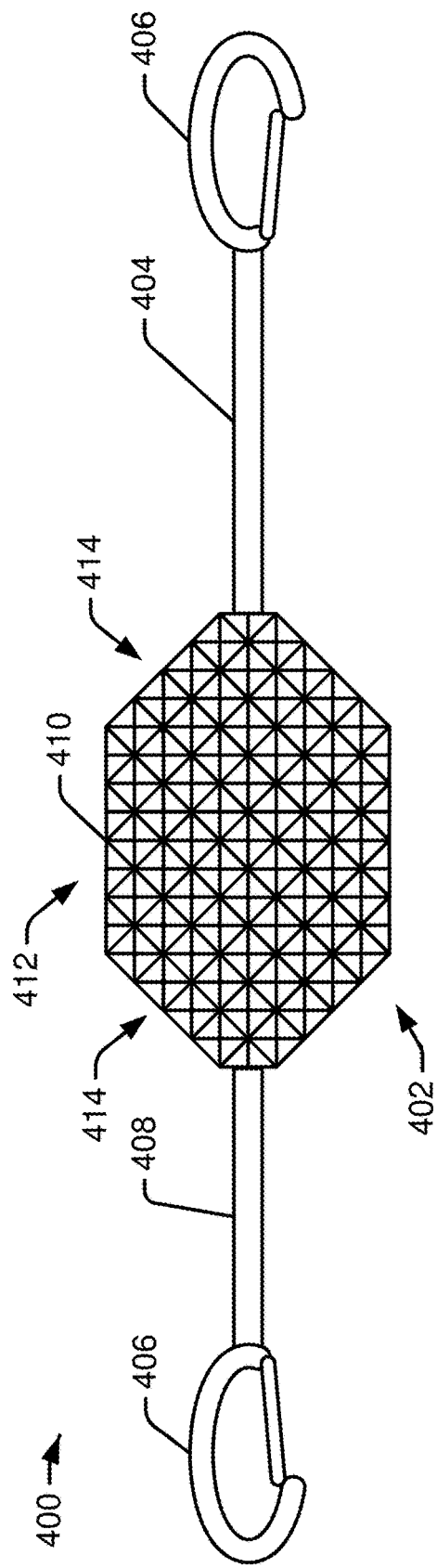

FIG. 4B shows a cross-sectional view of an embodiment of a portion of triangular lattice 410. In this illustrative embodiment it is contemplated that a core material 416 may be surrounded by a layer material 418. Additionally or alternatively, various embodiments contemplate core material 416 may provide a structural, a conductive, or combinations thereof characteristic. For example, core material 416 may comprise a steel, steel alloy, aluminum, aluminum alloy, composite material, including carbon fiber, among others, or combinations thereof. Additionally or alternatively, various embodiments contemplate that layer material 418 may provide a protective layer, an insulative layer, or combinations thereof. For example, layer material 418 may comprise a ceramic compound, rubber compound, among others, or combinations thereof. Additionally or alternatively, various embodiments contemplate that triangular lattice 410 with a conductive core 416 and insulative layer material 418 may provide a level of electrical protection to any electronics within from direct transfer through direct contact, since for example, the layer material 418 provides a insulative barrier. Additionally or alternatively, various embodiments contemplate that the conductive core 416 may provide protection from interference from electromagnetic fields transmission through a Faraday cage or shield effect.

FIG. 4C shows a cross-sectional view of an embodiment of a portion of triangular lattice 410. In this illustrative embodiment it is contemplated that a core material 420 may be surrounded by a mid-layer material 422. Additionally or alternatively, various embodiments contemplate that mid-layer material 422 may be surrounded by outer-layer 424. Additionally or alternatively, various embodiments contemplate core material 420 may provide a structural characteristic, mid-layer material 422 may provide a conductive characteristic, and/or outer-layer 424 may provide an insulative characteristic. Additionally or alternatively, various embodiments contemplate that this embodiment may provide similar features and/or benefits to those as described with respect to FIG. 4B.

FIGS. 5A and B show an illustrative embodiment of hoist system 500. For example, various embodiments contemplate hoist system 500 having a body section 502 coupled to at least one extendable member 504. Additionally or alternatively, extendable member 504 may be coupled to an attachment interface 506, for example, a hook, loop, carabiner, or combinations thereof, among others. Various embodiments contemplate extendable member 504 being selectably extended from or retracted into body section 502.

Additionally or alternatively, various embodiments contemplate a member 508 extending from body section 502. Various embodiments contemplate member 508 extending from body section 502 on a side substantially distal from the side extendable member 504 is coupled to. Additionally or alternatively, various embodiments contemplate that member 508 may be substantially rigid with respect to body section 502. Additionally or alternatively, various embodiments contemplate member 508 being extendable and retractable with respect to body section 502. For example, various embodiments contemplate member 508 being configured and operable substantially similar to extendable member 504. Additionally or alternatively, various embodiments contemplate member 508 being coupled to an attachment interface 506. Various embodiments contemplate that attachment interface 506 may be configured to be suitable to attached to various industry tools, for example, cable or wire grips, anchors, insulation sticks, among others, or combinations thereof. Additionally or alternatively, various embodiments contemplate attachment interface 506, member 508, body 502, member 504 are configured to apply a force sufficient to tension the desired cable and/or otherwise operate in the operational environment.

FIG. 5A also shows a cutaway view of body 502 showing illustrative internal components. For example, body 502 may house, or partially house, retraction device 510, for example a reel configured to selectably retract and extend extendable member 504. Various embodiments contemplate retraction device 510 being coupled to an actuating device 512, for example a motor. Various embodiments contemplate a connection between actuating device 512 comprising gears, belts, direct drive, among others, or combinations thereof to transfer power from the actuating device 512 to retraction device 510. Additionally or alternatively, various embodiments contemplate actuating device 512 being operatively coupled to a controller 514 and power source 516. Various embodiments contemplate controller 514 being operatively coupled to communication module 518, which may comprise an external antenna 520. Various embodiments contemplate antenna 520 being configured and located with respect to the body 502 to allow communication with devices outside of body 502. Additionally or alternatively, various embodiments contemplate antenna 520 being configured and located to provide protection to components located within body 502 from undesired electrical transmission, for example from electrically active conductors. Additionally or alternatively, antenna 520 may be located on body 502 to reduce the likelihood of accidental contact with an electrically active conductor. For example, antenna 520 may be located on a side of body 502 closer to member 508 than to extendable member 504 and/or away from an outside edge or surface.

FIG. 5A also shows hoist system 500 in a first configuration where member 504 is extended to a first position 524 a distance from body 502. FIG. 5B shows hoist system 500 in a second configuration where member 504 has been retracted to a second position 526 a distance from the body 502. In this example, member 504 under goes a retraction from the first position 524 to the second position 526 across a relative distance 528. Additionally or alternatively, various embodiments contemplate that a portion of member 504 approximately as long as distance 528 is stored by retraction device 510 in the second configuration. Additionally or alternatively, various embodiments contemplate that a force was applied to member 504 through retraction device 510 sufficient to cause the change from the first configuration to the second configuration. Additionally or alternatively, various embodiments contemplate configurations where force is applied directly to member 504 through contact with a surface of member 504. Additionally or alternatively, various embodiments contemplate that member 504 may be wound up by a mechanism separate from the force being applied to member 504 through contact with the surface of member 504. Additionally or alternatively, various embodiments contemplate portions of member 504 may exit body 502 after passing into body 502 and through the mechanism applying force to the surface of member 502. Additionally or alternatively, various embodiments contemplate a ratcheting mechanism allowing the retraction device 510 to retract a portion of member 504 without input from actuating device 512 while resisting extension of member 504 without input from actuating device 512.

Figure 6:
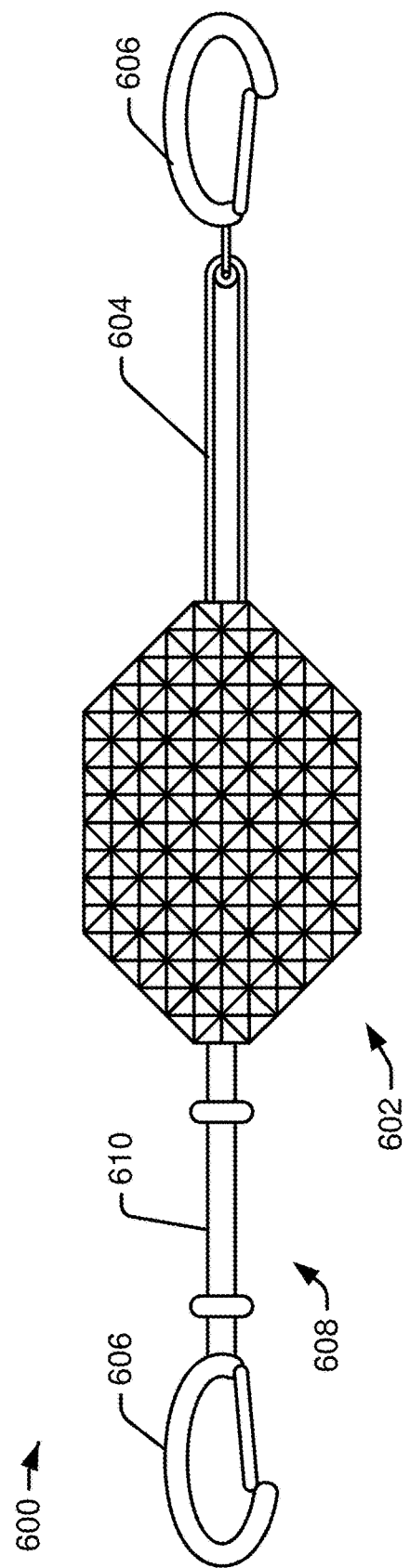
FIG. 6 shows an illustrative embodiment of hoist system.

FIG. 6 shows an illustrative embodiment of hoist system 600. For example, various embodiments contemplate hoist system 600 having a body section 602 coupled to at least one extendable member 604. Additionally or alternatively, extendable member 604 may be coupled to an attachment interface 606, for example, a hook, loop, carabiner, or combinations thereof, among others. Various embodiments contemplate extendable member 604 being selectably extended from or retracted into body section 602. In this illustrative embodiment, member 604 may comprise a block and tackle type configuration to gain a mechanical advantage.

Additionally or alternatively, various embodiments contemplate a member 608 extending from body section 602. Various embodiments contemplate member 608 extending from body section 602 on a side substantially distal from the side extendable member 604 is coupled to. Additionally or alternatively, various embodiments contemplate that member 608 may be substantially rigid with respect to body section 602. Additionally or alternatively, various embodiments contemplate member 608 being extendable and retractable with respect to body section 602. For example, various embodiments contemplate member 608 being configured and operable substantially similar to extendable member 604. Additionally or alternatively, various embodiments contemplate member 608 being coupled to an attachment interface 606. Various embodiments contemplate that attachment interface 606 may be configured to be suitable to attached to various industry tools, for example, cable or wire grips, friction grips, anchors, insulation sticks, among others, or combinations thereof. Additionally or alternatively, various embodiments contemplate attachment interface 606, member 608, body 602, member 604 are configured to apply a force sufficient to tension the desired cable and/or otherwise operate in the operational environment. In this illustrative embodiment a portion 610 of member 608 comprising an insulating material sufficient to replace an insulating link stick providing sufficient electrical insulation between attachment interfaces 606.

Illustrative Operational Environments

Figure 7:
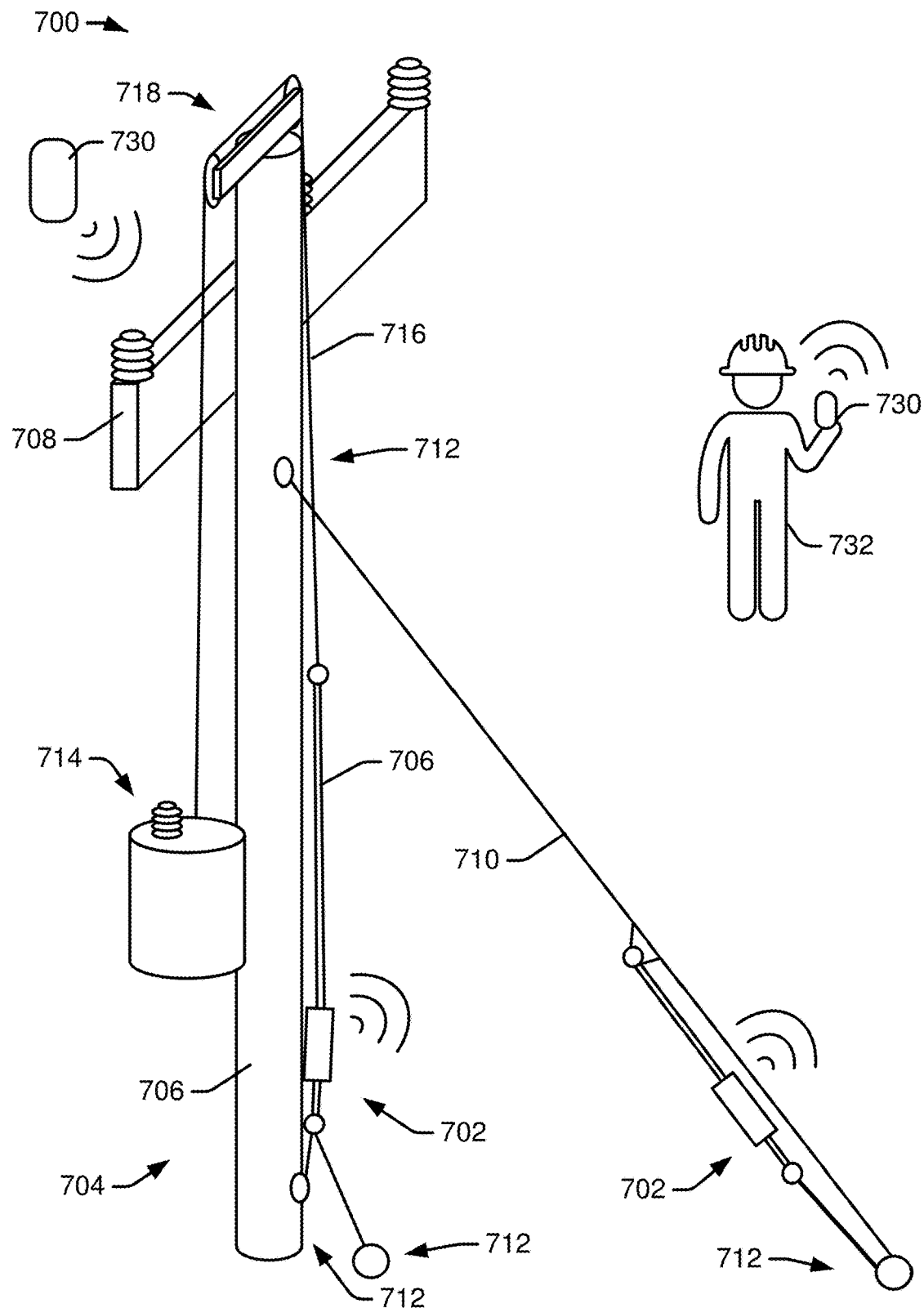
FIG. 7 shows another illustrative embodiment of an operating environment of a hoist system.

FIG. 7 shows an illustrative operational environment 700 with hoist system 702. For example, the operational environment may include a pole system 704 comprising a pole 706 and a cross arm 708. Additionally or alternatively, various embodiments contemplate the pole system including support extensions 710, for example a guywire, that may be coupled to one or more anchor points 712, for example, in the ground and on the pole 706. Additionally or alternatively, various embodiments contemplate a unit to be lifted 714, for example, a transformer that is to be installed on the pole system 704. In this example, a cable 706 may be coupled to the unit to be lifted 714 and coupled to a hoist system 702. Additionally or alternatively, various embodiments contemplate hoist system 702 coupled, on an end distal to the coupled cable 706 to an anchor point 712, for example, on the pole system 704 or to the ground, or a combination thereof. Additionally or alternatively, a cable management system 718 may be used to guide the cable 716 allowing for the unit 714 to be guided up and/or down the pole system 704.

Additionally or alternatively, various embodiments contemplate a hoist system 702 coupled to the support extension 710 configured to apply or release a tension on support extension 710.

FIG. 7 shows an illustrative embodiment of hoist system 702 having a control system that may be interacted with wirelessly. For example, hoist system 702 may interact wirelessly with device 730. Device 730 may be operated locally by user 732 or from a remote location. As will be discussed later, various embodiments contemplate that device 730 may communicate with hoist systems 702 directly. Additionally or alternatively, various embodiments contemplate that various units of hoist system 702 may communicate with other units of hoist system 702 or device 730, for example, in a master/slave hierarchy or a distributed peer-to-peer network, or combinations thereof to control the various units of the hoist system 702.

Figure 8:
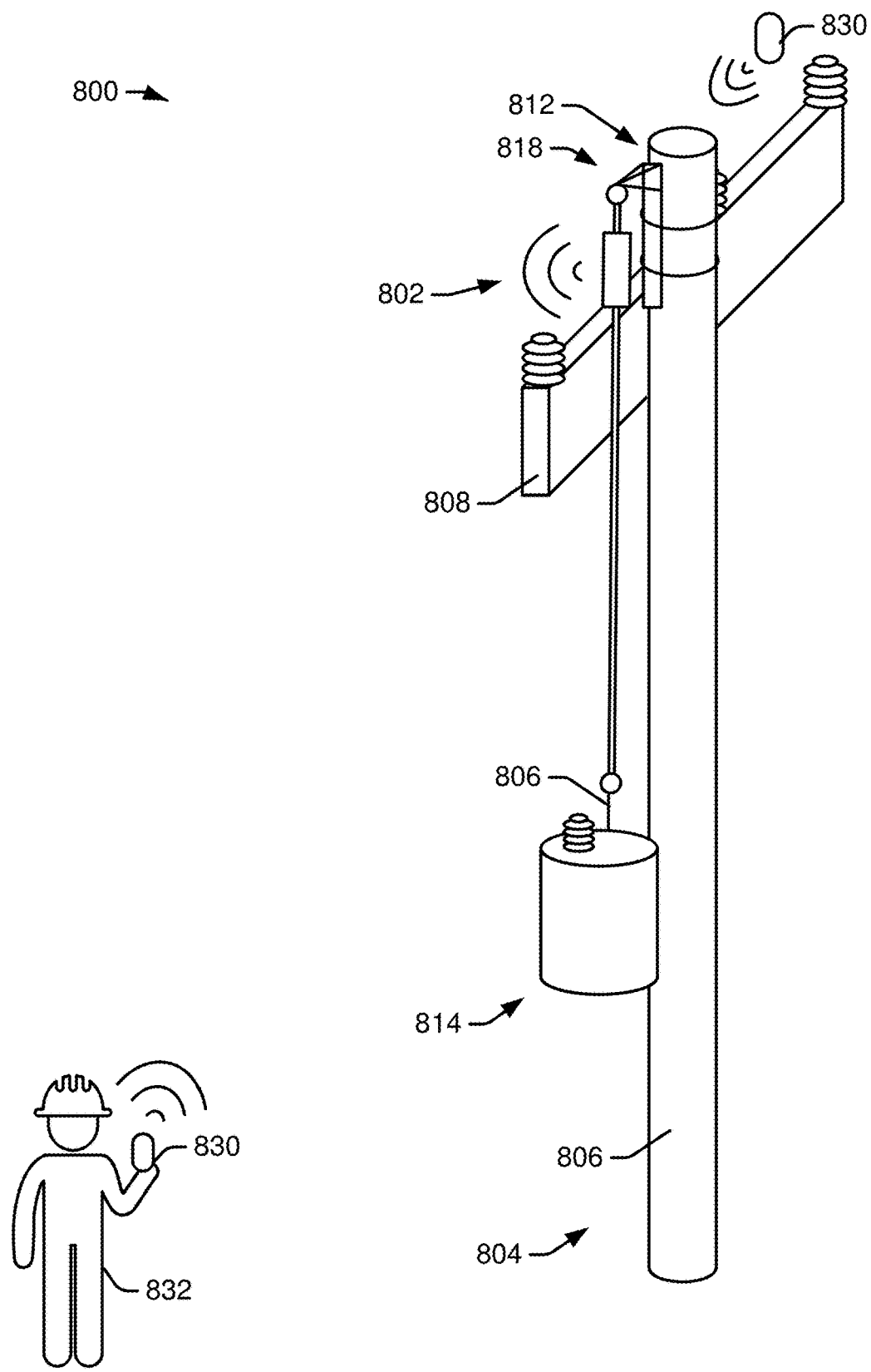
FIG. 8 shows another illustrative embodiment of an operating environment of a hoist system.

FIG. 8 shows an illustrative operational environment 800 with hoist system 802. For example, the operational environment may include a pole system 804 comprising a pole 806 and a cross arm 808. Additionally or alternatively, various embodiments contemplate a unit to be lifted 814, for example, a transformer that is to be installed on the pole system 804. In this example, a cable 806 may be coupled to the unit to be lifted 814 and coupled to a hoist system 802. Additionally or alternatively, various embodiments contemplate hoist system 802 coupled, on an end distal to the coupled cable 806 to an anchor point 812, for example, on the pole system 804 or to the ground, or a combination thereof. Additionally or alternatively, an anchor lift system 818 may be used to couple hoist system 802 to pole system 804 overhead allowing for the unit to be lifted 814 to be guided up and/or down the pole system 804.

FIG. 8 shows an illustrative embodiment of hoist system 802 having a control system that may be interacted with wirelessly. For example, hoist system 802 may interact wirelessly with device 830. Device 830 may be operated locally by user 832 or from a remote location. As will be discussed later, various embodiments contemplate that device 830 may communicate with hoist systems 802 directly. Additionally or alternatively, various embodiments contemplate that various units of hoist system 802 may communicate with other units of hoist system 802 or device 830, for example, in a master/slave hierarchy or a distributed peer-to-peer network, or combinations thereof to control the various units of the hoist system 802.

Illustrative Processes and Techniques

Figure 9:
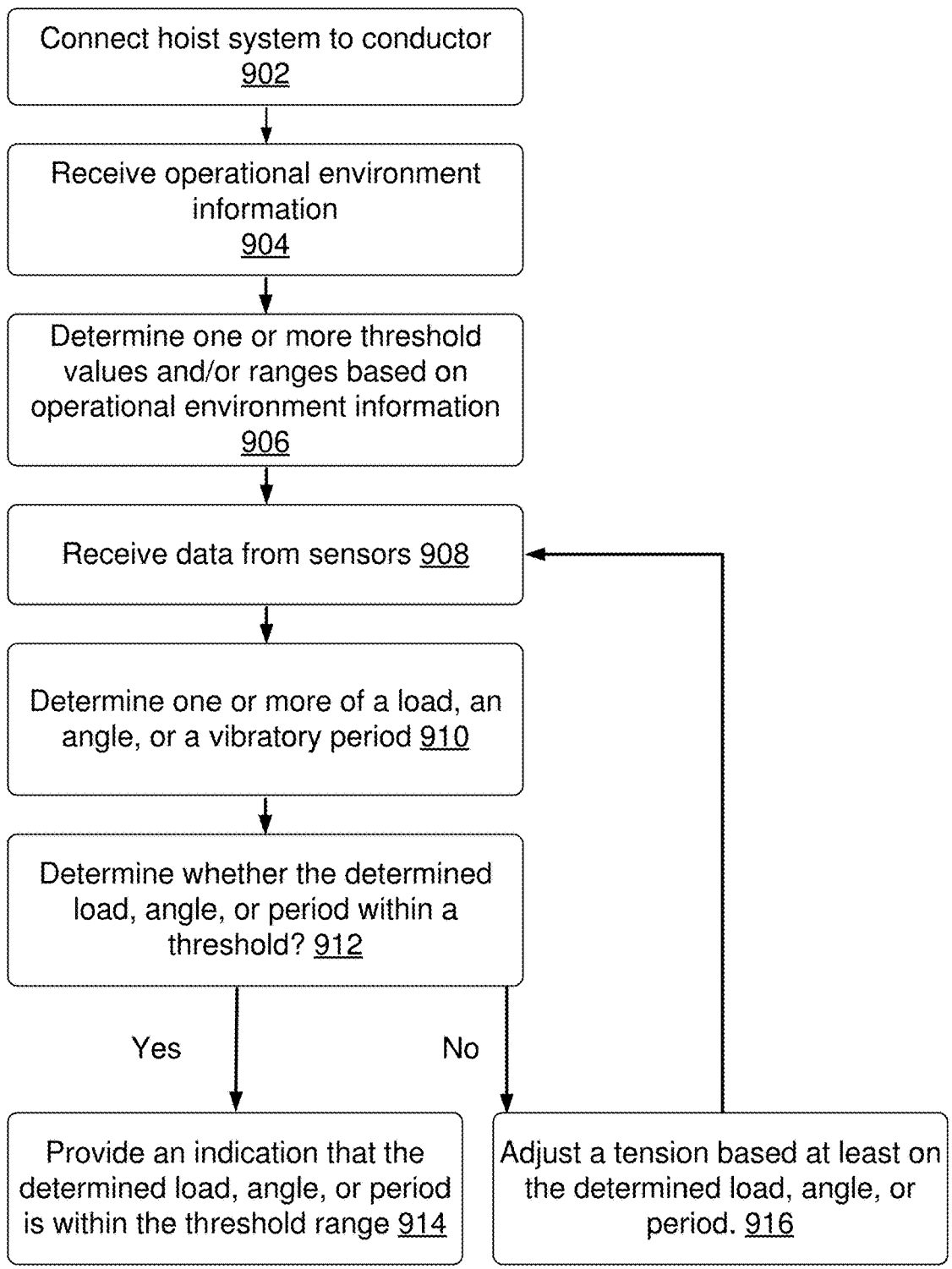
FIG. 9 shows an illustrative embodiment of the process that operate embodiments of the hoist system.

FIG. 9 shows an illustrative process and technique 900 for operating a hoist system. For example, at 902 various embodiments contemplate connecting a hoist system to a conductor, a cable, an anchor point, or combinations thereof.

At 904, hoist system may receive operational environmental information. For example, the hoist system may receive information regarding various aspects of the environment, the work to be completed, guidelines/regulations, among other factors, or combinations thereof. For example, the hoist system may receive data including, but not limited to, data related to characteristics of a conductor or conductors, ambient temperature, weather conditions, geographical location, climate, time of year, type of lift to be performed (e.g., tensioning a conductor or raising equipment, e.g., transformer), heights of cross arms, elevation of adjacent pole systems, span between pole systems, distance of conductor on cross arm from pole or center of rotation/support, number of conductors and location on cross arm, distance of hoist system from connection to pole system, type of anchor points. Additionally or alternatively, the hoist system may receive data including standards and/or requirements including but not limited to, regulatory standards, industry standards, operator standards, best practices, manufacturer standards, (e.g., tension requirements, sag requirements, operating environmental temperature ranges among others), or combinations thereof, among other factors. Additionally or alternatively, various embodiments contemplate that the hoist system may receive data specific to the location including, but not limited to, pole data (e.g., GPS location, pole identifiers, pole position data, pole dead end distances, conductor diameter, conductor type, number and type of phases, voltage, current, among others, or combinations thereof.

At 906, a hoist system may determine one or more threshold values and/or ranges based, at least in part, on operational environment information. For example, operational environmental information may include at least some of the data received at 904. For example, based at least in part on the data, the system may determine a tension limit. For example, a conductor type, a span length, a conductor temperature, a conductor size, ambient temperature, or other factors, may used to calculate a target tension, an upper tension limit, a lower tension limit, a target sag distance, an upper sag limit, a lower sag limit, or combinations thereof among others.

At 908, the hoist system may receive data from sensors. For example, sensors may be located in a hoist system, an adjacent hoist system, a distant hoist system, as well as data sensors external to a hoist system, or combinations thereof.

At 910, the hoist system may determine one or more of a load, an angle, or a vibratory period based at least in part on the data received at 908. For example, after the completion of the conductor straining process, the sagging process may begin. Various embodiments contemplate that the process may create a proper conductor tension for the expected life of the line. For example, various standards, for example, IEEE 524, NESC, RUS, and manufacturer installation guidelines, may describe the input values and criteria for the proper tensioning of the line. Additionally or alternatively, various embodiments contemplate that various ambient environmental conditions may be taken into consideration in order to complete the sag tension process. For example, temperature, wind velocity, and exposure to radiant solar energy may affect the overall tension and profile of the conductor catenary. Additionally or alternatively, utilizing stringing travelers and mechanical tensioning specific portions of conductor control spans may be utilized to tension the conductor.

Additionally or alternatively, various embodiments contemplate a number of methodological approaches to measure the tensions within the conductor. For example, sighting may be used. Various embodiments contemplate that one or more sensors may determine the bottom of the catenary curve of the line from a known distance. Based at least in part on the bottom of the conductor catenary a vertical may be determined.

Additionally or alternatively, various embodiments contemplate measuring wave propagation along the line to determine the tension. For example, an impulse load may be applied transverse to the span of the line. Additionally or alternatively, an impulse load may be applied along the span of the line. Various embodiments contemplate an actuator within or external to the hoist system may apply the load. Various embodiments contemplate one or more sensors, within or external to the hoist system, may detect waves propagating along the line and returning back along the line. Various embodiments contemplate measuring a period of time until a specific number of waves return. Based at least in part on the measured time, the tension of the conductor may be determined. For example, when the line wave is initiated it will travel to the conductor support until it is reflected in reverse phase back to the next structure. From this structure it is reflected in reverse phase and begins the second cycle of wave motion. The length of time between waves corresponds to a definite sag which is determined based at least in part on the factors noted above.

For example, While the hoist system is connected to the line/conductor the hoist system, for example, a motor may rapidly start and stop one or several times. This action may impart a wave into the line/conductor and the return waves may be counted with various internal or external sensors or mechanisms. Various embodiments contemplate determining the sag based at least on the time duration where the Sag D may equal 48.3(t/2n)2, where Sag D may be the sag of the line/conductor in inches, t is the time in seconds, and n is the number of return waves counted.

Additionally or alternatively, various embodiments contemplate measuring tension in the line to determine sag. For example, various sensors may be used external or internal to the hoist system. Various embodiments contemplate that a span that is relatively short in length or relatively low in tension may be with a load sensor, for example, a dynamometer. For example, a dynamometer may use two or more indictors to display two or more tension values from the load/tension sensor. For example, one indicator may indicate tension throughout the sagging process and the other indictor may indicate the maximum tension placed on the sensor during the pull.

Additionally or alternatively, various embodiments contemplate determining sag based at least in part on an angle of orientation of the hoist system. For example, the angle of orientation of the hoist system may be used with the length of the strap and ambient temperature. Additional data to be added, for example, as manual input, may include conductor size, span length and type of conductor sagging to be completed. Additionally, or alternatively, specific information regarding the long term elastic properties of the specific conductor may be used in making sag determinations for initial sag and final sag deviances while using the hoist system for initial sag purposes.

Various embodiment contemplate various methods of determining the orientation and strap length of the hoist system. For example, a hoist system may extend a known length of strap from the hoist system to connect with the line/conductor, to the anchor location, or combinations thereof. This extended length may be used to determine the orientation. For example, a positional indicator may make a first state input regarding angle and orientation of the hoist system. Additionally or alternatively, the hoist system may allow input of various information. For example, a user interface prompt allows the user to input information, for example, span length, conductor, ambient temperature, angle and wind velocity. As the hoist system begins to apply tensions to the line/conductor the specific catenary profile of the line changes. Various embodiments contemplate that the length of strap changes may be logged and hoist body positional indicator may correlate changes in hoist angle with changes in the amount of strap retracted. Various embodiments contemplate that during this period of measurement and analysis the specific catenary profile for the specific span length of the specific sag parameters may be determined. For example, the sag parameters may be recognized as being either under or over sag. Various embodiments contemplate adjusting the length of the strap until the desired conductor sag is obtained.

At 912, the hoist system may determine whether determined load, angle, or period, for example, as determined at 910, is within a threshold, for example as determined at 906. Additionally or alternatively, various embodiments contemplate that the hoist system may operate in a load measurement mode. For example, the mode may allow the hoist system to pull the line/conductor to a specific value and, for example, via wireless communication collaborate with an adjacent set of hoists to sag conductors evenly. This may utilize inputs from the motors to determine the total amount of tension pulled without regard to additional data they user may input to correct for specific sag conditions.

If it is determined that the determined load, angle, or period is within a threshold, then at 914, the hoist system may provide an indication that the determined load, angle, or period is within the threshold range.

If it is determined that the determined load, angle, or period is not within a threshold, then at 916, the hoist system may adjust a tension or a load based at least on the determined load, angle, or period. Additionally or alternatively, the hoist system may return to 908 to receive data and determine the next steps. Additionally or alternatively, various embodiments contemplate that the system may repeat the aforediscussed loop a limited number of times. For example, the limited number of times may be based at least in part on a time duration, a number of cycles, a received sensor value being past a second threshold. For example, if the hoist system is attempting to adjust a load or a tension for a first period of time or a first number of cycles, or receiving a data value beyond a second threshold may indicate a fault in the system, a problem with the environment, structure being adjusted, or combinations thereof. In this situation, the hoist system causes the hoist system to return the structure and/or the operational environment to a safe configuration. Additionally or alternatively, the hoist system may provide a notice of the fault. For example, the hoist system may monitor operational characteristics of the motor, for example, the magnetic flux of a motor, that is applying tension to a conductor. If the characteristic of the motor, for example the magnetic flux exceeds a threshold value, this may indicate that the line has become snagged on an obstacle or some other physical fault has occurred. Additionally or alternatively, various embodiments contemplate that the hoist system may monitor rates of movement of the hoist system. For example, a sudden acceleration of the motor or intake of a connection member, may indicate a break in one of the conductors, failure of the attachment device or intermediate connector or insulating elements, failure of the pole system, failure of a portion of the hoist system, or combinations thereof among others.

Illustrative Architecture

Figure 10:
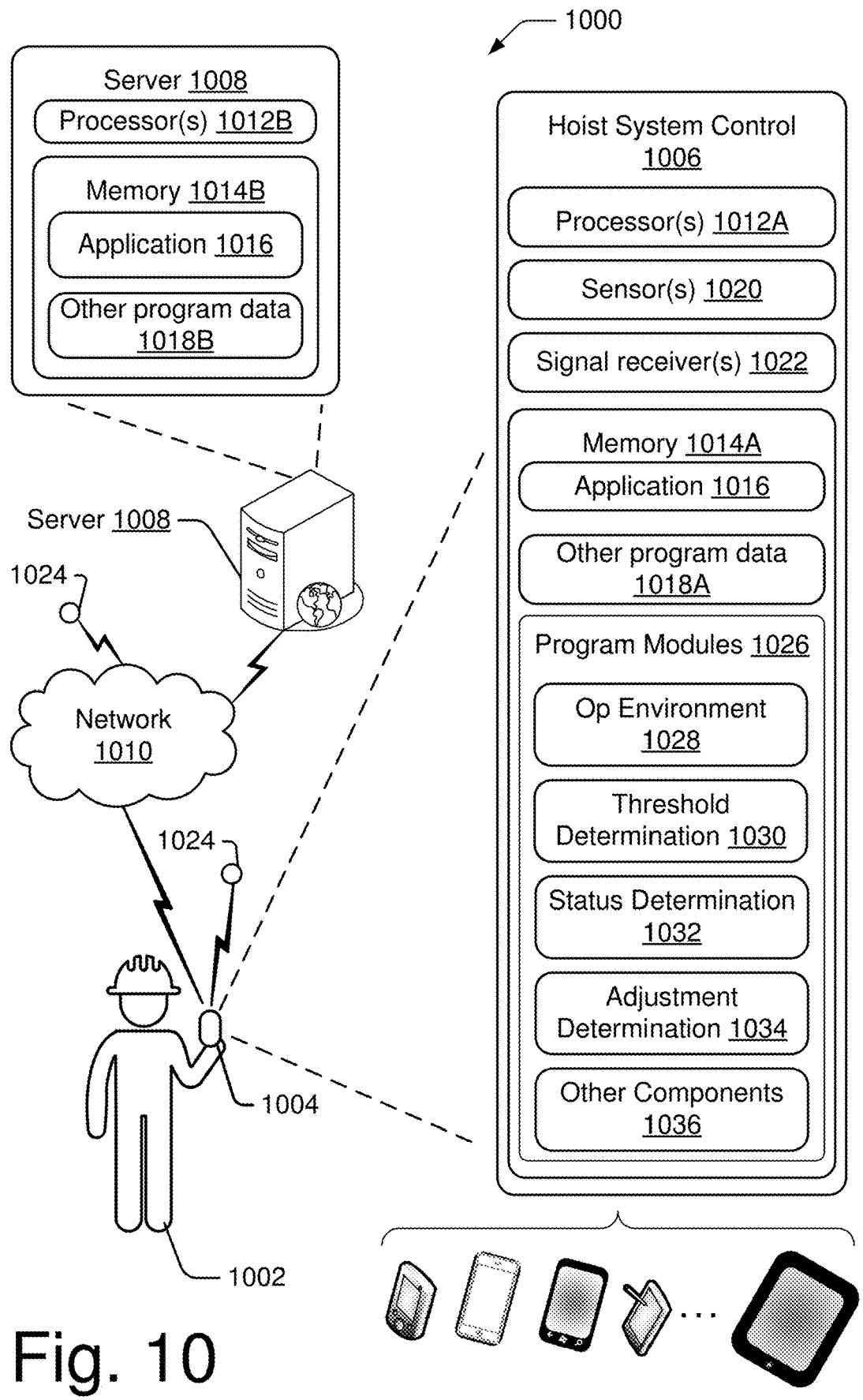
FIG. 10 shows an illustrative embodiment of a device in operating environments and illustrative systems similar to those discussed with respect to FIGS. 1-9.

FIG. 10 illustrates an exemplary environment 1000 usable to implement hoist system control. The environment 1000 may include a user 1002 and a client device 1004. In one embodiment, the client device 1004 may include a hoist system control 1006. In some embodiments, part or all of the hoist system control 1006 may be included in a server 1008 that is separate from the client device 1004. In that case, the client device 1004 may communicate with the hoist system control 1006 through a network 1010. In at least one embodiment, functions of the hoist system control 1006 may be included and distributed among multiple devices. For example, the client device 1004 may include part of the functions of the hoist system control 1006 while other functions of the hoist system control 1006 may be included in the server 1008.

The client device 1004 may be implemented on any of a variety of conventional computing devices including, for example, a notebook or portable computer, a handheld device, a netbook, an Internet appliance, a portable reading device, an electronic book reader device, a tablet or slate computer, a game console, a mobile device (e.g., a mobile phone, a personal digital assistant, a smart phone, and the like), a media player, and the like or a combination thereof.

The network 1010 may be a wireless or a wired network, or a combination thereof. The network 1010 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). Further, the individual networks may be wireless or wired networks, or a combination thereof. In one embodiment, the network 1010 may include a near field communication channel. Examples of a near field communication channel include, but are not limited to, infrared communication, radio-frequency (RF), Bluetooth®, WiFi®, WiFi® connect, ZigBee®, infrared data association (IrDA), high-frequency modulated visible light and/or modulated audio.

In one embodiment, the client device 1004 includes one or more processors 1012A coupled to memory 1014A. The memory 1014A may include one or more applications 1016 (e.g., a hoist system control application, a navigation application, a map application, a web browser, and the like) and other program data 1018A. The memory 1014A may be coupled to or associated with, and/or accessible to other devices, such as network servers, routers, and/or other client devices. Additionally or alternatively, the client device 1004 may include one or more sensors 1020 that may provide data to the client device 1004. In one embodiment, the one or more sensors 1020 may include, but are not limited to, an accelerometer, a pedometer, a digital compass, a gyroscope, a network signal detector, a near-field communication transmitter or receiver, an image acquisition and recognition system, a GPS receiver, and the like.

Additionally or alternatively, the client device 1004 may include a signal receiver 1022 that may receive signals from other devices. For example, receiver 1022 may receive signals and or information from sensors 1024. A sensor 1024 may be located somewhere in the operational environment 1000, for example on a hoist system, a pole system, on the user 1002, or removed from the operational environment. Additionally or alternatively, sensor 1024 may be a dedicated device for sensing and transmitting data or sensor 1024 may comprise part of, or an entirety, of another device including, but not limited to, a notebook or portable computer, a handheld device, a netbook, an Internet appliance, a portable reading device, an electronic book reader device, a tablet or slate computer, a game console, a mobile device (e.g., a mobile phone, a personal digital assistant, a smart phone, and the like), a media player, a watch, an accelerometer, a pedometer, a digital compass, a gyroscope, a network signal detector, a near-field communication transmitter or receiver, an image acquisition and recognition system, a GPS receiver, and the like or a combination thereof.

In various embodiments, memory 1014A may include program modules 1026. For example, the hoist system control 1006 may include an operational environment module 1028. The operational environment module 1026 may be configured to receive and organize data relating to the operational environment. By way of example and not limitation, the operational environment module 1028 may detect or determine features of the operational environment through one or more sensors 1020 of the client device 1004, sensors 1024, or from inputs, for example, from user 1002. Additionally or alternatively, various embodiments contemplate that threshold determination module 1030 may determine threshold ranges. For example, the threshold determination module 1030 may determine an upper and/or lower range of a tension, a load, and/or a frequency/period of the system. Additionally or alternatively, various embodiments contemplate status determination module 1032 may determine a status of the environment, for example, the status of one or more hoist systems. For example, the module may determine a load, tension, or period based at least in part on data received. Additionally or alternatively, the module may determine whether the load, tension, or period is within a threshold range. Additionally or alternatively, various embodiments contemplate an adjustment determination module 1034. For example, adjustment determination module 1034 may determine, based at least in part on the load, tension, or period, and threshold values, an adjustment to be made to the system. For example, if a load is determined to be below a threshold range, the adjustment determination module 1034 may determine to increase the tension by a first amount. Additionally or alternatively, the adjustment determination module 1034 may cause a hoist system to increase a tension on a conductor.

Illustrative Computing Device and Illustrative Operational Environment

Figure 11:
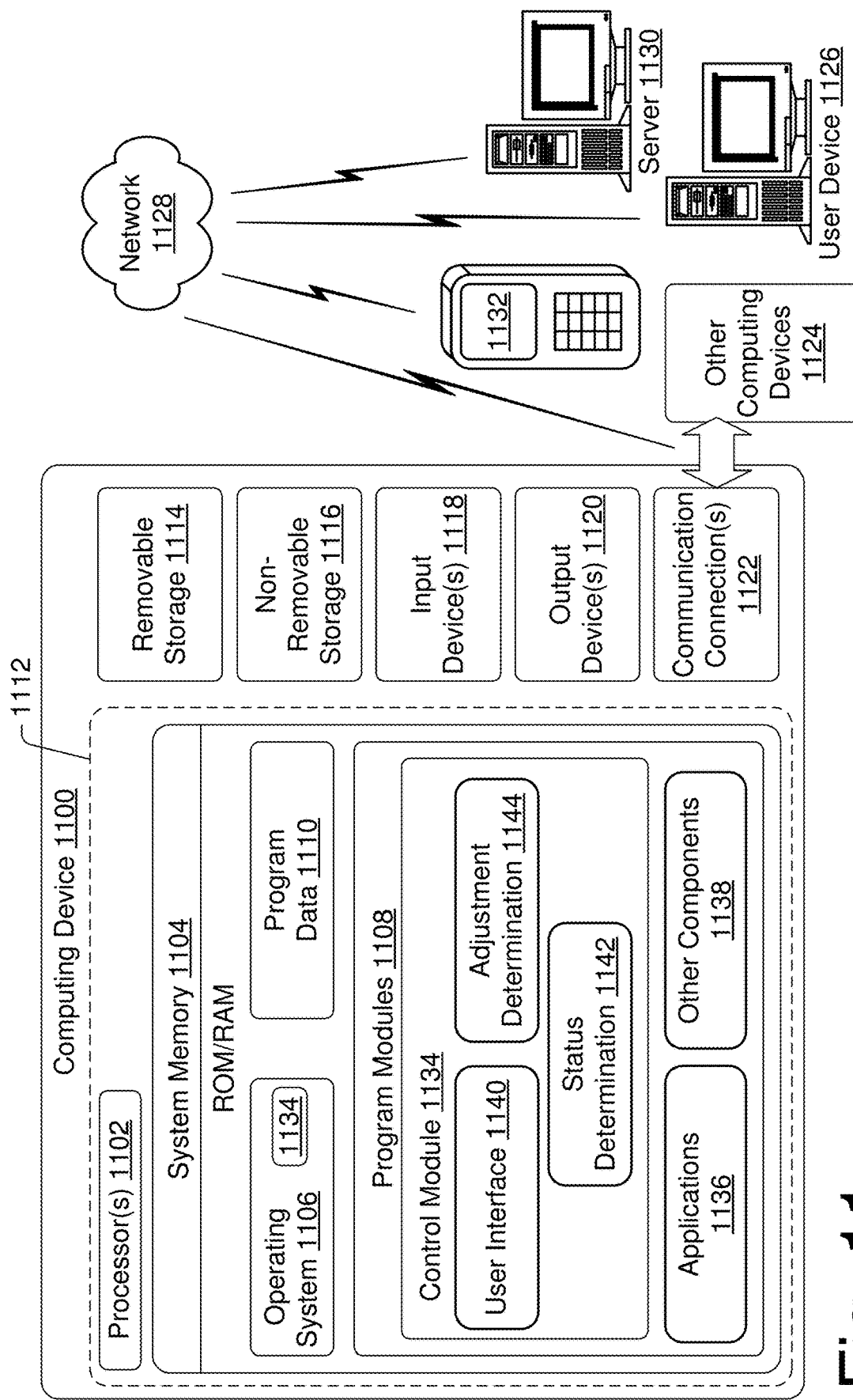
FIG. 11 shows an illustrative embodiment of a computing device.

FIG. 11 illustrates a representative computing device 1100 that may, but need not necessarily be used to, implement the system and methods described herein, in accordance with various embodiments. The techniques and mechanisms described herein may be implemented by multiple instances of the computing device 1100, as well as by any other computing device, system, and/or environment. The computing device 1100 shown in FIG. 11 is only one example of a computing device and is not intended to suggest any limitation as to the scope of use or functionality of any computing device utilized to perform the processes and/or procedures described above.

In at least one configuration, the computing device 1100 includes at least one processor 1102 and system memory 1104. The processor(s) 1102 may execute one or more modules and/or processes to cause the computing device 1100 to perform a variety of functions. In some embodiments, the processor(s) 1102 may include a central processing unit (CPU), a graphics processing unit (GPU), both CPU and GPU, or other processing units or components known in the art. Additionally, each of the processor(s) 1102 may possess its own local memory, which also may store program modules, program data, and/or one or more operating systems.

Depending on the exact configuration and type of the computing device 1100, the system memory 1104 may be volatile (such as RAM), non-volatile (such as ROM, flash memory, miniature hard drive, memory card, or the like) or some combination thereof. The system memory 1104 may include an operating system 1106, one or more program modules 1108, and may include program data 1110. The operating system 1106 includes a component-based framework 1134 that supports components (including properties and events), objects, inheritance, polymorphism, reflection, and provides an object-oriented component-based application programming interface (API). The computing device 1100 is of a very basic illustrative configuration demarcated by a dashed line 1112. Again, a terminal may have fewer components but may interact with a computing device that may have such a basic configuration.

Program modules 1108 may include, but are not limited to, applications 1136, a control module 1134, a user interface 1140, a status determination module 1142, an adjustment determination module 1144, and/or other components 1138.

The computing device 1100 may have additional features and/or functionality. For example, the computing device 1100 may also include additional data storage devices (removable and/or non-removable) such as, for example, magnetic disks, optical disks, or tape. Such additional storage is illustrated in FIG. 11 by removable storage 1114 and non-removable storage 1116.

The storage devices and any associated computer-readable media may provide storage of computer readable instructions, data structures, program modules, and other data. Computer-readable media includes, at least, two types of computer-readable media, namely computer storage media and communication media.

As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media may embody computer-readable instructions, data structures, program modules, or other data in a modulated data signal, such as a carrier wave. As defined herein, computer storage media does not include communication media.

Moreover, the computer-readable media may include computer-executable instructions that, when executed by the processor(s) 1102, perform various functions and/or operations described herein.

The computing device 1100 may also have input device(s) 1118 such as a keyboard, a mouse, a pen, a voice input device, a touch input device, etc. Output device(s) 1120, such as a display, speakers, a printer, etc. may also be included.

The computing device 1100 may also contain communication connections 1122 that allow the device to communicate with other computing devices 1124, such as over a network. By way of example, and not limitation, communication media and communication connections include wired media such as a wired network or direct-wired connections, and wireless media such as acoustic, radio frequency (RF), infrared, and other wireless media. The communication connections 1122 are some examples of communication media. Communication media may typically be embodied by computer readable instructions, data structures, program modules, etc.

FIG. 11 also shows a schematic diagram of an illustrative operating environment where an illustrative system may operate. For example, various embodiments of the system may operate on the computing device 1100. The computing device 1100 may interact with a user 1126 directly or indirectly. The computing device may be connected to a network 1128. The network device 1128 may provide access to other computing devices 1124 including a server 1130, mobile devices 1132, and/or other connections and/or resources. Connections may be wired or wireless.

The illustrated computing device 1100 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The implementation and administration of a shared resource computing environment on a single computing device may enable multiple computer users to concurrently collaborate on the same computing task or share in the same computing experience without reliance on networking hardware such as, but not limited to, network interface cards, hubs, routers, servers, bridges, switches, and other components commonly associated with communications over the Internet, as well without reliance on the software applications and protocols for communication over the Internet.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments. Any portion of one embodiment may be used in combination with any portion of a second embodiment.

What is claimed is:

1. A system comprising:
one or more sensors;
a tensioning device configured to selectively tension a conductor;
one or more processors; and
memory storing computer executable instructions that, when executed by the one or more processors, cause the one or more processors to perform operations comprising:
receiving data from the one or more sensors;
based at least in part on the data, determining a conductor status of the conductor that includes one or more of a load, an angle, or a period;
determining that the conductor status does not satisfy a range of conductor statuses; and
based at least in part on determining that the conductor status does not satisfy the range of conductor statuses, causing the tensioning device to apply a force to the conductor.

2. The system of claim 1, further comprising determining the force to apply to the conductor, wherein the force is below a maximum force to be applied to the conductor and a sum of the maximum force and an existing force on the conductor satisfies a threshold range of conductor tension.

3. The system of claim 1, wherein causing the tensioning device to apply the force to the conductor comprises:
determining the force to apply to the conductor such that the conductor status satisfies the range of conductor statuses;
determining a force application rate at which to apply the force; and
applying the force to the conductor at the force application rate.

4. The system of claim 3, wherein the force application rate is below a maximum rate.

5. The system of claim 1, wherein the period comprises a vibratory period or vibratory frequency of the conductor indicating a tension of the conductor.

6. The system of claim 1, wherein the range of conductor statuses is based at least in part on at least one of characteristics of the conductor, weather, a time of year, a length of the conductor, or a type of connection between the conductor and a pole.

7. The system of claim 1, further comprising a connection member coupled to the tensioning device and the conductor, and wherein the at least a portion of the connection member is configured to wind around at least a portion of a drum.

8. The system of claim 1, the operations further comprising:
receiving second data from the one or more sensors;
based at least in part on the second data, determining a second conductor status of the conductor that includes one or more of a second load, a second angle, or a second period; and
determining that the second conductor status satisfies the range of conductor statuses.

* * * * *